United States Patent
Maeda et al.

(10) Patent No.: US 11,346,748 B2
(45) Date of Patent: May 31, 2022

(54) METHOD FOR EXTRACTING SIGNAL IN PRESENCE OF STRONG NOISE

(71) Applicant: Hitachi, Ltd., Tokyo (JP)

(72) Inventors: Daisuke Maeda, Mountain View, CA (US); Sudhanshu Gaur, Santa Clara, CA (US)

(73) Assignee: Hitachi, Ltd, Tokyo (JP)

(*) Notice: Subject to any disclaimer, the term of this patent is extended or adjusted under 35 U.S.C. 154(b) by 418 days.

(21) Appl. No.: 16/421,978

(22) Filed: May 24, 2019

(65) Prior Publication Data

US 2020/0370995 A1 Nov. 26, 2020

(51) Int. Cl.
| | |
|---|---|
| G06N 20/00 | (2019.01) |
| G01M 13/028 | (2019.01) |
| G01M 13/045 | (2019.01) |
| G01M 13/00 | (2019.01) |
| H04L 67/12 | (2022.01) |
| H04W 4/38 | (2018.01) |
| G01N 29/04 | (2006.01) |

(52) U.S. Cl.
CPC .......... *G01M 13/00* (2013.01); *G01M 13/028* (2013.01); *G01M 13/045* (2013.01); *G06N 20/00* (2019.01); *H04L 67/12* (2013.01); *H04W 4/38* (2018.02); *G01N 29/04* (2013.01)

(58) Field of Classification Search
CPC .. G01M 13/00; G01M 13/028; G01M 13/045; G06N 20/00; H04L 67/12; H04W 4/38; G01N 29/04
See application file for complete search history.

(56) References Cited

U.S. PATENT DOCUMENTS

| | | | |
|---|---|---|---|
| 10,168,248 B1* | 1/2019 | Morey | G01M 13/045 |
| 2004/0078171 A1* | 4/2004 | Wegerich | G05B 23/0254 |
| | | | 702/188 |
| 2007/0277613 A1* | 12/2007 | Iwatsubo | F16C 19/527 |
| | | | 702/141 |
| 2011/0067493 A1* | 3/2011 | Baehr | G01M 1/22 |
| | | | 73/462 |
| 2011/0307093 A1 | 12/2011 | Tsai et al. | |
| 2016/0349737 A1 | 12/2016 | Yen et al. | |
| 2016/0370799 A1* | 12/2016 | Denton | G06F 11/16 |

(Continued)

OTHER PUBLICATIONS

"Prediction of small drill bit breakage by wavelet transforms and linear discriminant functions"; by by K. Mori, N. Kasashima, J.C. Fu, and K. Muto; International Journal of Machine Tools & Manufacture 39 (1999) 1471-1484 (Year: 1999).*

(Continued)

*Primary Examiner* — Roy Y Yi
*Assistant Examiner* — Geoffrey T Evans
(74) *Attorney, Agent, or Firm* — Procopio, Cory, Hargreaves & Savitch LLP

(57) ABSTRACT

Example implementations described herein are directed to systems and methods for extracting signal in presence of strong noise for industrial Internet of Things (IoT) system especially for monitoring systems of consumable items such as lathe machines, coolers and so on. Example implementations can utilize a sawtooth mother Wavelet instead of usual wavelet analysis to cleanse the incoming sensor data, thereby allowing for the converting sensor data to feature values despite having heavy noise interference.

18 Claims, 13 Drawing Sheets

(56) References Cited

U.S. PATENT DOCUMENTS

2019/0033171 A1* 1/2019 Zhang ................ G01M 13/028
2019/0301974 A1* 10/2019 Mansour ............ G01M 13/045

OTHER PUBLICATIONS

"Application of Wavelet Transform Techniques to Vibration Studies"; by Lepik, Ulo; Proc. Estonian Acad. Sci. Phys. Math., 2001, 50, 3, 155-168 (Year: 2001).*

Xu, C. et al. "The relationships between cutting parameters, tool wear, cutting force and vibration" Advances in Mechanical Engineering 2018, pp. 1-14, vol. 10, Iss. 1 (14 pages).

* cited by examiner

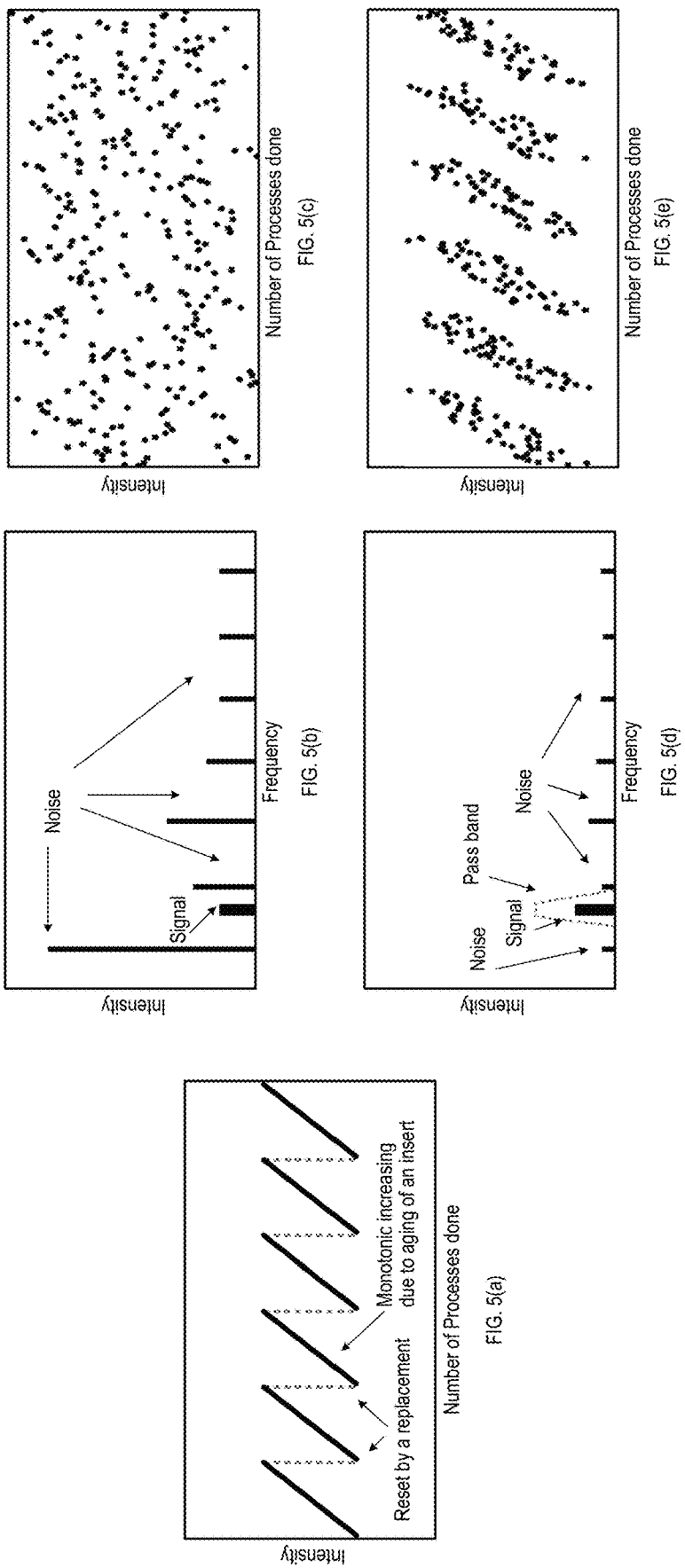

METHOD FOR EXTRACTING SIGNAL IN PRESENCE OF STRONG NOISE

BACKGROUND

Field

The present disclosure is directed to industrial systems, and more specifically, to systems and methods for extracting signals in an industrial system despite strong background noise.

Related Art

Increasing productivity while overcoming inevitable social problems such as the shortage of labor and the aging of society has now become a common problem in the manufacturing industry. For example, there are high demands for transforming machine maintenance from human knowledge to IIoT (Industrial Internet of Things) systems.

Extracting signal that reflects a real-time state of a machine from sensors is a key technology for such IIoT applications. In particular, monitoring and managing consumable tools and their planning have become important due to the need to suspend the production line for replacements. However, legacy machines that are already working in a production line do not equip enough sensors since they are not designed for such IIoT systems, and have hitherto relied on human knowledge to maintain operation.

Developing IIoT applications for legacy machines has been challenging as the machines that are in a production line need to be in operation at all times, and cannot be stopped or modified as any modifications may affect production quality. Thus, it is not normally permitted to place sensors (e.g. accelerometer, strain gauge, or even temperature sensor) inside an enclosure of a machine. Instead, such sensors may only be permitted at the designated surface of an enclosure to ensure that it is a non-invasive modification.

As a result of this compromise, the physical signal strength that a sensor device can collect from an objective source would be considerably low due to a propagation loss and is a minority of most sensor-collected readings. In the related art, the physical signal from a signal source has some distinct frequency peaks. However, such peaks may not be observable if the attenuation due to propagation loss is considerably significant. Thus, noise interferes with the majority of such sensor-collected readings.

A related art example of such a signal source is an insert of a lathe machine. The insert in a lathe machine gets worn during the process and needs to be replaced periodically so that the production quality can be maintained (i.e. dimensions or roughness of the production). In a related art example, it was noted that there are physical mechanisms of tool wear and therefore there should be a monotonic increasing of vibration with respect to cutting time. The state of an insert can be observed by monitoring vibration of a machine. Human experts would know if a lathe machine needs a replacement of an insert or not by hearing such sounds generated from the insert despite the noisy shop floor.

In another related art example, there is a platform and method to indicate whether a tool needs a replacement by utilizing intensity of vibration. However, such related art implementations do not account for how to extract signal in presence of strong noise. In another related art example, there is an apparatus for health detection of servo motor by utilizing FFT (Fast Fourier Transform), WT (Wavelet Transform), and HHT (Hilbert-Hung transform). However, its measurement objective is only directed to the dominated frequency component which, although can be extracted from wide-band sensor readings if the vibration sensor is closely-installed to the signal source, has not been particularly practical.

SUMMARY

Example implementations described herein generally relate to a signal processing method designed to extract signal from the consumable signal source in presence of strong noise.

Aspects of the present disclosure can involve a device communicatively coupled to one or more sensing devices and to a server, the device involving a processor, configured to convert sensor data received from the one or more sensing devices into frequency component data, the frequency component data involving measurements on one or more parameters indicative of degradation for another device associated with the one or more sensing devices; execute a correlation process on the frequency component data to identify one or more frequency bands that are correlated with a sawtooth pattern; and providing one or more feature values that are extracted from the sensor data with a band limitation within the one or more frequency bands, to the server.

Aspects of the present disclosure can involve a computer program, which can store instructions involving converting sensor data received from the one or more sensing devices into frequency component data, the frequency component data comprising measurements on one or more parameters indicative of degradation for another device associated with the one or more sensing devices; executing a correlation process on the frequency component data to identify one or more frequency bands that are correlated with a sawtooth pattern; and providing one or more feature values that are extracted from the sensor data with a band limitation within the one or more frequency bands, to the server. The computer program may be stored in a non-transitory computer readable medium and executed by one or more processors.

Aspects of the present disclosure can involve a method for a system involving a device communicatively coupled to one or more sensing devices and to a server, the method involving converting sensor data received from the one or more sensing devices into frequency component data, the frequency component data involving measurements on one or more parameters indicative of degradation for another device associated with the one or more sensing devices; executing a correlation process on the frequency component data to identify one or more frequency bands that are correlated with a sawtooth pattern; and providing one or more feature values that are extracted from the sensor data with a band limitation within the one or more frequency bands, to the server.

Aspects of the present disclosure can involve a system involving means for converting sensor data received from one or more sensing devices into frequency component data, the frequency component data involving measurements on one or more parameters indicative of degradation for another device associated with the one or more sensing devices; means for executing a correlation process on the frequency component data to identify one or more frequency bands that are correlated with a sawtooth pattern; and means for providing one or more feature values that are extracted from the sensor data with a band limitation within the one or more frequency bands, to the server.

Aspects of the present disclosure can involve a system, which involves a server; one or more sensing devices; and a device communicatively coupled to the one or more sensing devices and the server, the device involving a processor, configured to convert sensor data received from the one or more sensing devices into frequency component data, the frequency component data involving measurements on one or more parameters indicative of degradation for another device associated with the one or more sensing devices; execute a correlation process on the frequency component data to identify one or more frequency bands that are correlated with a sawtooth pattern; and provide one or more feature values that are extracted from the sensor data with a band limitation within the one or more frequency bands, to the server.

BRIEF DESCRIPTION OF DRAWINGS

FIG. 5(a) shows the ideal intensity of feature values with respect to the number of processes done, in accordance with an example implementation.

FIG. 5(b) illustrates signal and noise in the frequency domain wherein signal is in the minority before applying a band pass filter, in accordance with an example implementation.

FIG. 5(c) illustrates the intensity of the data without a band limitation, in accordance with an example implementation.

FIG. 5(d) illustrates an example of a band pass filter causing the signal to be in the majority in accordance with an example implementation.

FIG. 5(e) illustrates an intensity of the data with the band pass filter, in accordance with an example implementation.

DETAILED DESCRIPTION

Figure 1:
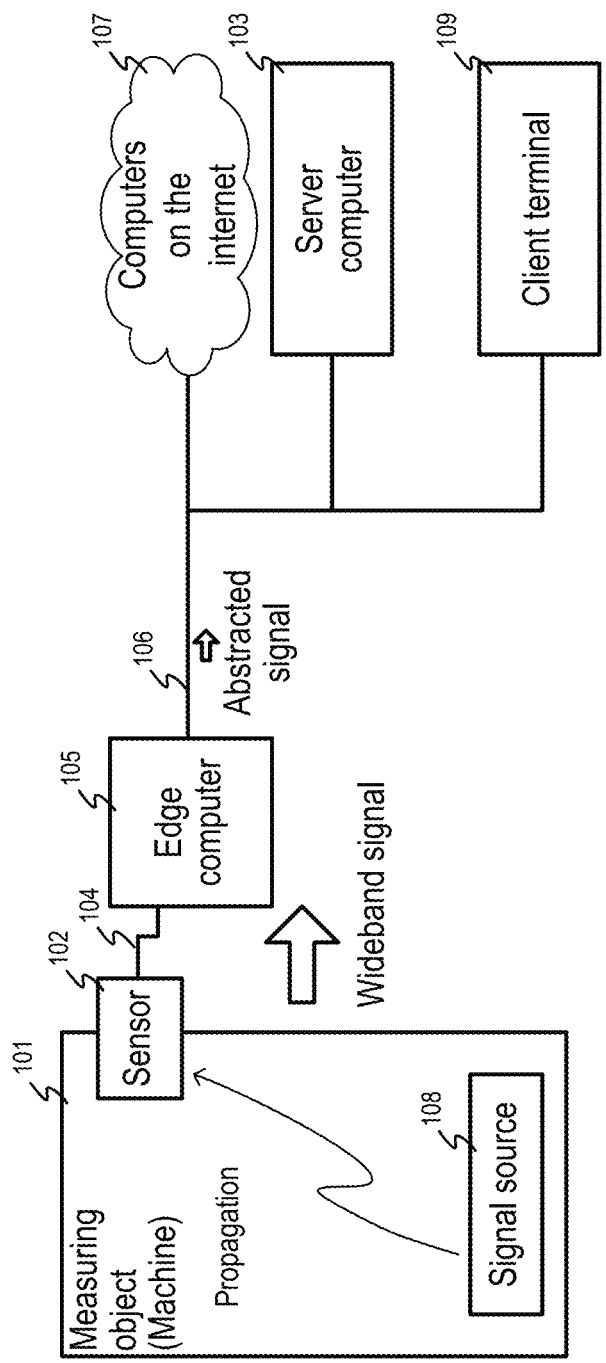
FIG. 1 illustrates an example sensing system with the signal processing method, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In example implementations described herein, the following terms are defined as follows.

Signal: A physical amount that is useful for an application monitoring a consumable signal source and its digitized value, which may contain random noise (e.g., thermal noise).

Noise: Physical amounts that are not useful for the application. In other words, they are generated from an application-unrelated signal source. The digitized value of such measurements may be also called "noise", which can be in the form of random noise (e.g., random thermal noise).

Data: Combined physical amounts of signal and noise, which can also be in digitized form depending on the desired implementation.

Raw data: Data without any signal processing except for digitization.

Signal processing: As is known in the art for signal processing technology. Signal processing does not necessarily mean only processing signals as defined above, but can also involve processing of noise or data.

First Example Implementation

In a first example implementation, there is a system with a signal processing method. FIG. 1 illustrates an example sensing system with the signal processing method, in accordance with an example implementation. In this example, the system involves at least one measuring object 101, a consumable signal source 108 which is installed in the measuring object 101, at least one wideband sensor 102 which is not attached to the consumable signal source 108, but is attached to the measuring object 101, and an edge computer 105 connected to the wideband sensor 102 via a communication method 104 (e.g. a metal cable conducting analog voltage) that transmits wideband signals from the wideband sensor 102 to the edge computer 105. In example implementations, the wideband sensor has wider bandwidth than the bandwidth of the signal source. The edge computer 105 provides the signal processing method designed to extract signal from signal source in presence of strong noise, which can be implemented through a software implementation, a programmed FPGA (Field Programmable Gate Array) IC, or an ASIC (Application Specific Integrated Circuit). The details of the signal processing method are provided below.

As a result of the signal processing, the edge computer 105 transmits an abstracted signal to a computer on the internet 107, a client terminal (e.g. smartphones or tablets) 109, or a server computer 103 which is on the same local network 106. In example implementations, the abstracted signal can be a signal that is compressed or signal which involves the signal itself along with some semantic information related to the state of the signal source 108. As an example, assume that there is an application involving wearing states and replacements of an insert that is installed in a lathe machine by utilizing wideband accelerometer readings. In such an example, the measuring object 101, wideband sensor 102, and consumable signal source 108 correspond to a lathe machine, an accelerometer, and an insert respectively.

Figure 2:
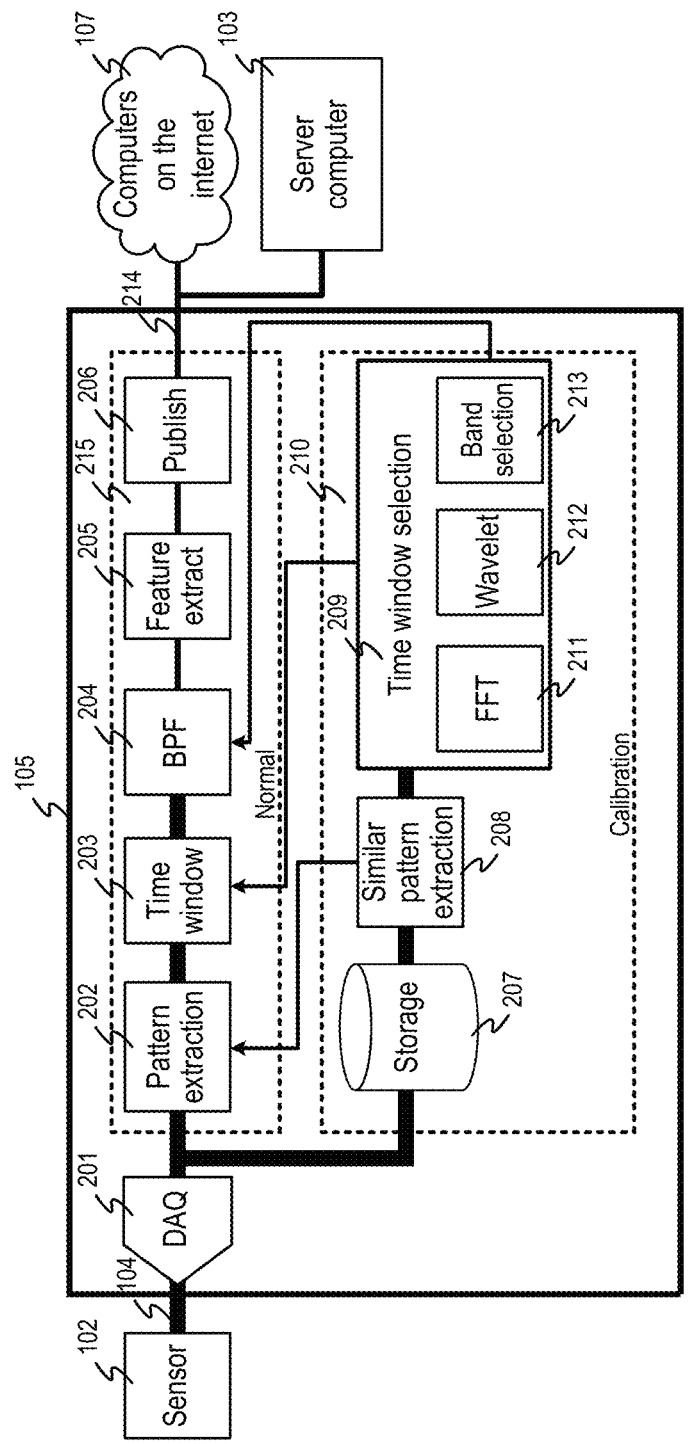
FIG. 2 illustrates the block diagram of the signal processing method in the edge computer, in accordance with an example implementation.

FIG. 2 illustrates the block diagram of the signal processing method in the edge computer 105, in accordance with an example implementation. In this block diagram, the communication method 104 is assumed to be a metal cable and the wideband sensor 102 outputs analog voltage as a signal. The DAQ (Data Acquisition) device 201 performs analog-to-digital conversion so that the edge computer 105 can apply digital signal processing. After the deployment, the edge computer 105 runs an initial calibration loop 210 followed by a normal loop 215. Details of the remaining elements of the edge computer 105 are described herein with respect to FIGS. 3 and 4(a) to 4(c).

Figure 3:
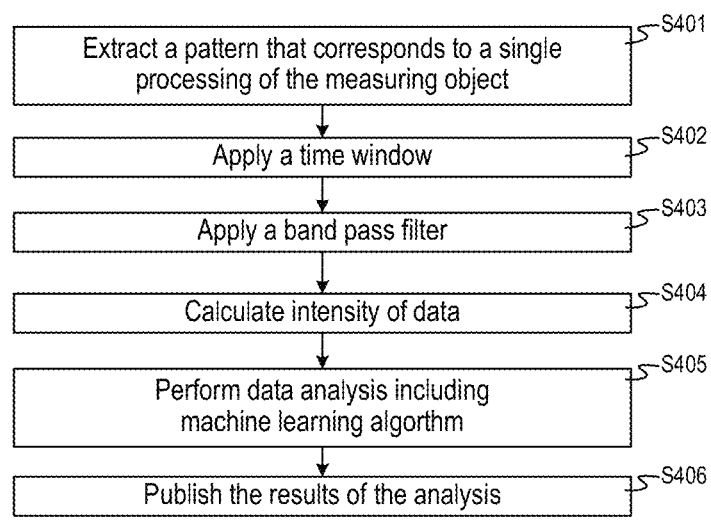
FIG. 3 illustrates the process of the normal loop, in accordance with an example implementation.

FIG. 3 illustrates the process of the normal loop 215, in accordance with an example implementation. In the normal loop, the edge computer 105 performs following steps to extract physical amount from signal source in presence of strong noise and transmit it to another computer or server.

Figures 4A, 4B, 4C:
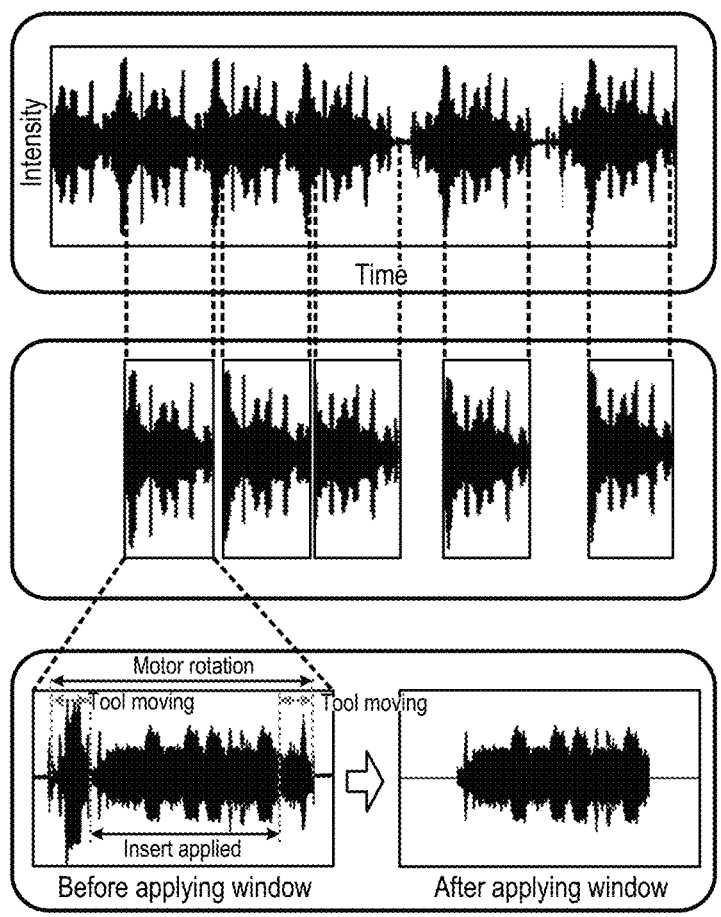
FIGS. 4(a) to 4(c) illustrates an example of raw data, separated data, and data in a time window, respectively, in accordance with an example implementation.

At S401, the process extracts patterns corresponding to a single processing of the measuring object 101 from the continuous raw data in the pattern extraction block 202. Example of the continuous raw data is shown in FIG. 4(a) and separated patterns are shown in FIG. 4(b). This process can be conducted by the cross-correlation analysis with predetermined pattern which corresponds to a single process of the measuring object. The predetermined pattern is provided by the similar pattern extraction block 208. The behavior of the similar pattern extraction block 208 that is a part of the calibration loop will be disclosed later.

At S402, the process applies a time window to the extracted pattern in the time window block 203. This process is added since the signal from signal source may not be available across the whole time-series data and therefore applying a time window to the time-series data may increase the SNR (Signal to Noise Ratio) in the following analysis. For example, as shown in FIG. 4(c), in the process of a lathe machine, an insert would not necessarily be applied to a cutting part during the whole process. Therefore, applying a time window to extract data subset corresponding to the time when signal source is working will increase the SNR of the data. The parameters for the time window are provided by the time window selection block 209. The behavior of the time window selection block 209 that is a part of the calibration loop will be described in detail further below.

At S403, the process applies a band pass filter in the band pass filter block 204 followed by the feature extract block 205. In the following feature extract block, the data which was applied the time window will be converted to a simple feature value such as RMS (Root Mean Square), peak-to-peak, or kurtosis depending on the desired implementation.

FIG. 5(a) shows the ideal intensity of feature values with respect to the number of processes done, in accordance with an example implementation. It is expected that consumable things have (a) a reset of the feature value after a replacement and (b) monotonic increasing (or decreasing) of the intensity due to aging. This corresponds to the wearing of an insert in the example. However, as explained above, the sensor is placed on the surface of an enclosure due to restrictions regarding the underlying machine, and therefore the signal strength that a sensor device can collect from an objective consumable signal source would be in the minority as noise becomes the majority of the sensor-collected readings. This is conceptually illustrated in FIG. 5(b), which illustrates signal and noise in the frequency domain wherein signal is in the minority before applying a band pass filter, in accordance with an example implementation. As a result, the intensity of feature values without any band-selection would not reflect the actual real-time states of the objective as shown in FIG. 5(c), which illustrates the intensity of the data without a band limitation, in accordance with an example implementation. If the frequency band of the signal is known, better SNR can be obtained by applying a band pass filter, which facilitates a better estimation of the state of the signal source. Thus the digital and variable band pass filter block 204 applies a band pass filter with a pass band at a frequency band for a signal. FIG. 5(d) illustrates an example of a band pass filter causing the signal to be in the majority in accordance with an example implementation. FIG. 5(e) illustrates an intensity of the data with the band pass filter, in accordance with an example implementation. The pass band frequency is provided by the band selection block 213 is a part of the calibration loop. This behavior will be disclosed further in detail below.

At S404, the process calculates feature value of data in the feature extract block 205 as explained in the previously.

At S405, the process performs data analysis including a machine learning algorithm so that semantic information can be estimated related to the state of the objective consumable signal source in the feature extract block 205. For example, RUL (remaining useful life) or a flag that is indicative of the feature value exceeding a predetermined threshold can be example results. Other results are also possible in accordance with the desired implementation.

At S406, the process publishes the result of the analysis in the previous block to a computer on the internet 107 or server computer 103 that is in the same local network. This process will be done in the publish block 206.

As explained above, the normal loop utilizes a waveform pattern corresponding to a single process for the pattern extraction, parameters for the time window, and a frequency pass band for the band pass filter.

Figure 6:
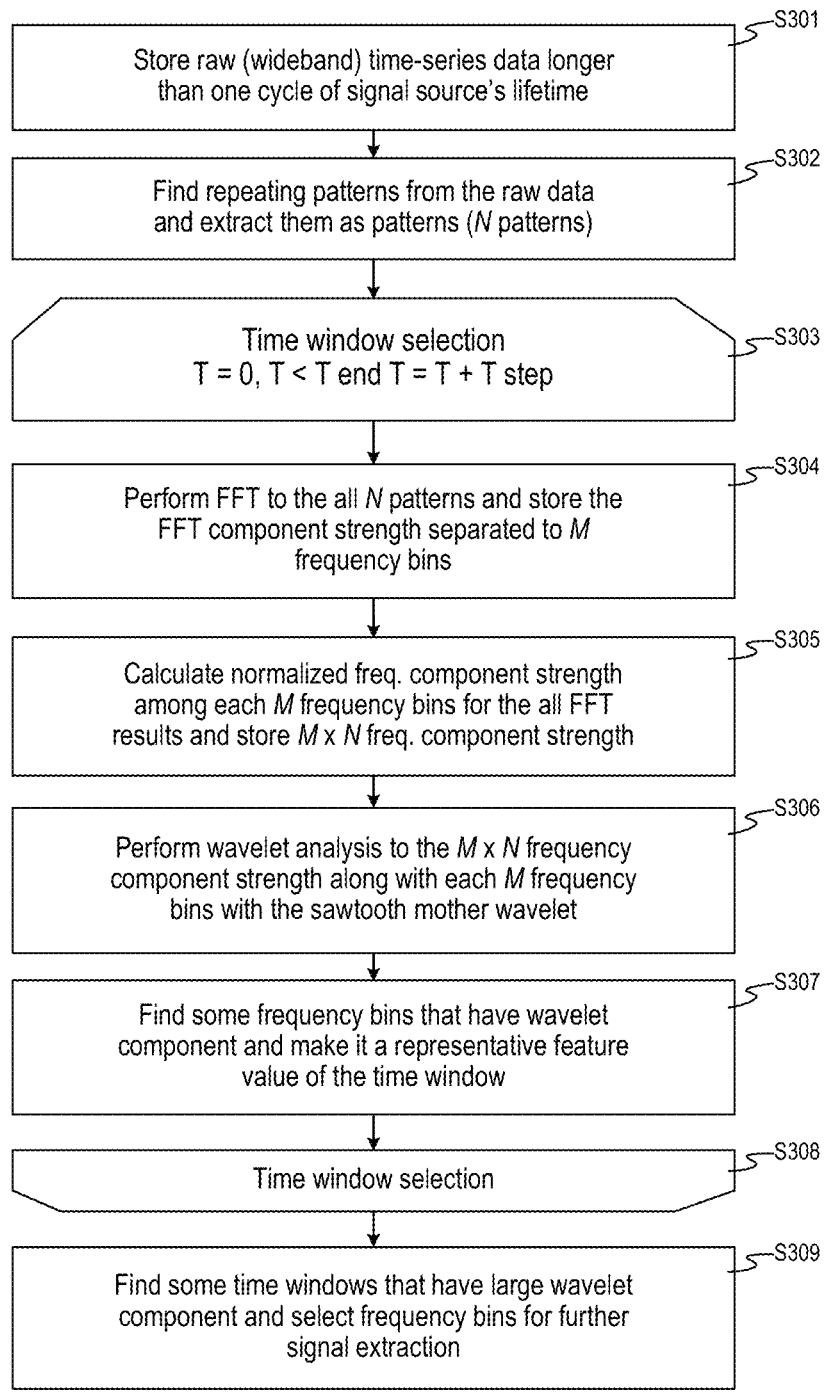
FIG. 6 illustrates an example flow of the calibration loop, in accordance with an example implementation.

These parameters are determined by the calibration loop that is performed prior to the normal loop. FIG. 6 illustrates an example flow of the calibration loop 210, in accordance with an example implementation. In the calibration loop shown in FIG. 6, the edge computer 105 performs the following process to identify the waveform pattern corresponding to a single process, the time period that has the signal from the consumable signal source 108, and a frequency band for the band pass filter that has the signal from the consumable signal source 108 respectively. In the following description, the calibration loop 210 of FIG. 6 will be described with respect to FIGS. 7-9.

At S301, the process stores a certain length of raw data to storage 207. The length of the raw data should be at least more than one cycle of the lifetime of the consumable signal source 108. More specifically, one cycle corresponds to time between a replacement and another replacement.

At S302, the process finds a repeating pattern from the raw data from the similar pattern extraction part 208. As manufacturing processes normally involve iteration of a same processes, the similar pattern extraction part 208 extract the common pattern and then keep it as a pattern of a single manufacturing process. This process can be conducted by an autocorrelation analysis or cross-correlation analysis with predetermined pattern model. After identifying the common pattern, this step also divides the raw data to single process pattern. In this example, the assumption is there are N patterns.

At S303, the start of the "for loop" is initiated in the time window selection block 209. At S303, the process selects the initial time window (as shown from separated patters 801 to patterns with time window applied 802 of FIG. 8) which is from T=0 to T=$T_{WINDOWLENGTH}$.

Figure 8:
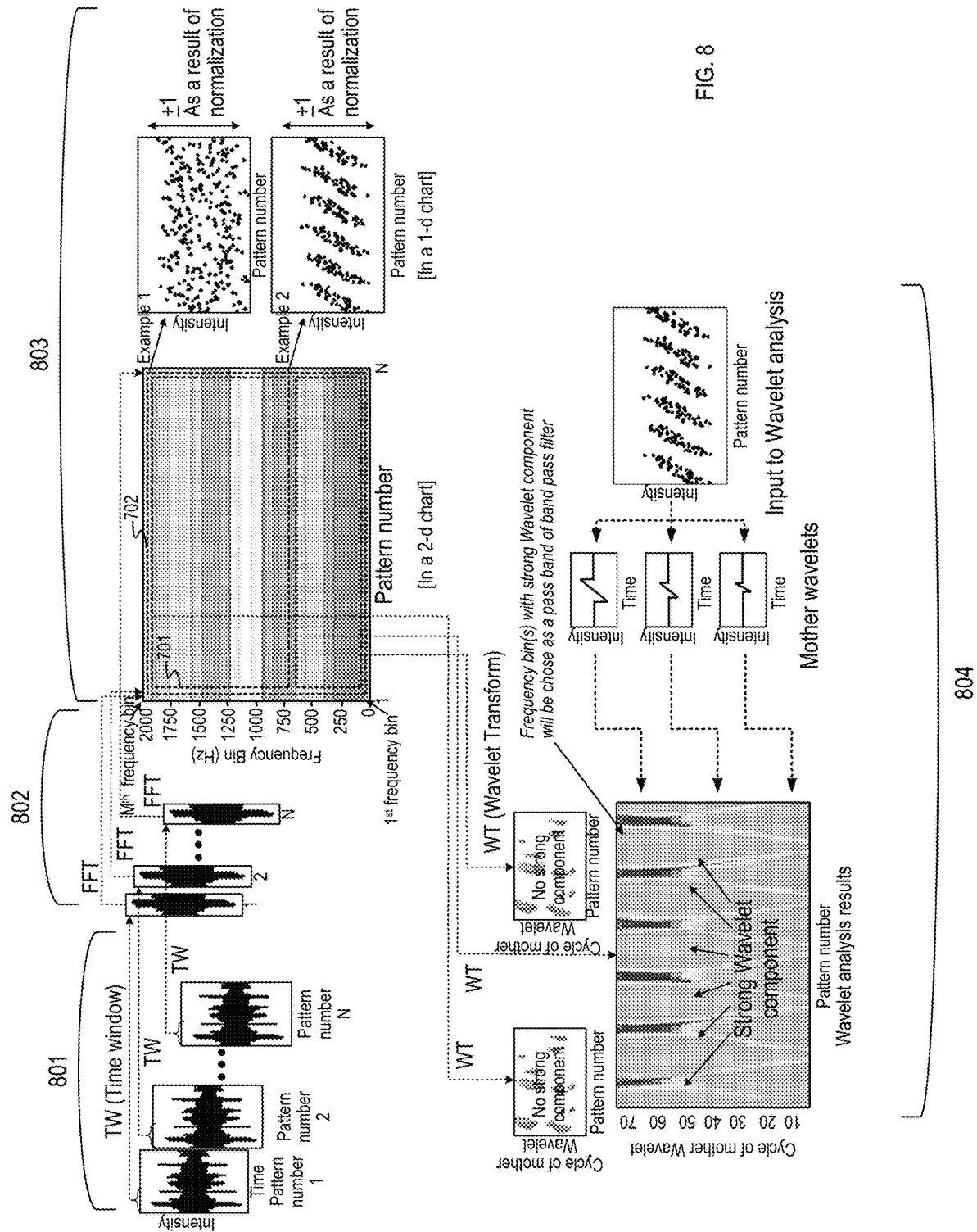
FIG. 8 illustrates example processing of waveforms with wavelet analysis, in accordance with an example implementation.

At S304, the flow performs FFT to the all N patterns and store the absolute frequency components strength separated to M frequency bins (as shown from patterns with time window applied 802 to FFT results of each separated pattern 803 of FIG. 8). This process is done by FFT block 211. If the FFT length is shorter than the pattern length, FFT block 211 performs FFT repeatedly until reaching the end of the pattern so that it can obtain frequency component data across the whole pattern. Then, the process summarizes all FFT result by calculating RMS (root mean square), average, or max(·) function for each frequency bin. One FFT result is shown as 701 in FFT results 803. The summarized values in each frequency bin can be regarded as frequency-limited feature values. The reason why the process at S304 uses FFT while S403 in the normal loop uses a band pass filter is that this step has to analyze all available frequency bins and therefore FFT is quicker than applying band pass filters across the all frequency bins.

At S305, the FFT block 211 also calculates normalized frequency component data Normalization is achieved by, for example, dividing each frequency component data by RMS of FFT component values across one frequency bin or dividing frequency component data by peak-to-peak of FFT component values across one frequency bin. A few results of normalizations are graphically shown in FFT results 803.

Figure 9A:
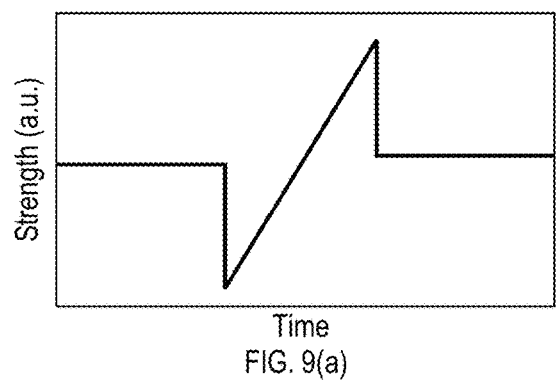
FIGS. 9(a) and 9(b) illustrate variations of sawtooth mother wavelets, in accordance with an example implementation.
Figure 9B:
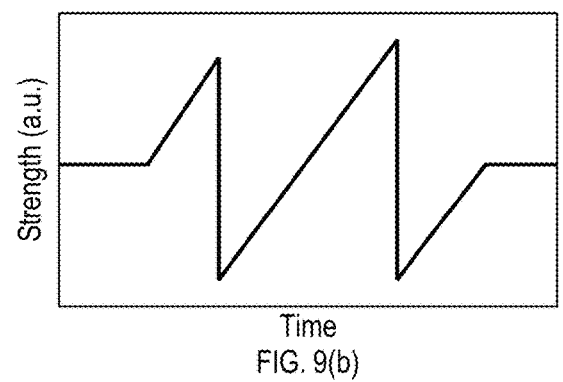

At S306, the process performs WT (Wavelet Transform) to the M×N frequency component strength along with each M frequency bins with a sawtooth mother wavelet in the wavelet analysis block 212 (as shown from FFT results 803 to wavelet analysis results for each frequency bin of FFT results 804 in FIG. 8). One example of input for one wavelet analysis is shown as 702 in FFT results 803. Variations of sawtooth mother wavelets are illustrated in FIGS. 9(a) and 9(b). However, in example implementations, the wavelets do not have to be linear against the time or the number of processes. For example, the wavelets can be proportional to time to the n-th power or a log function of time or an experiential function of time are also possible. The reasons why a sawtooth mother wavelet can be utilized are described further below.

Figure 7C:
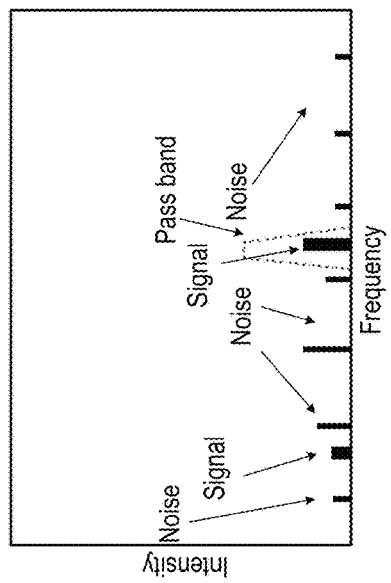
FIGS. 7(a) to 7(c) illustrate examples of signal and noise in the frequency domain, in accordance with an example implementation.
Figure 7B:
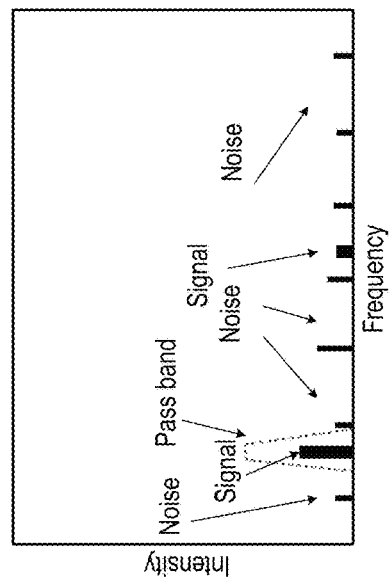
Figure 7A:
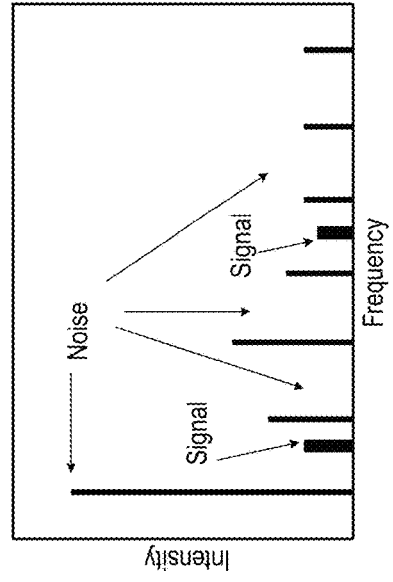

At S307, the process finds a frequency bin that has the largest wavelet component and makes the largest value a representative wavelet component value of the current time window. This step is conducted by the wavelet analysis block 212, results of which are shown at 804 of FIG. 8. Further, if more than one frequency bin is chosen, then there can be a need multiple band pass filter steps S403 and intensity calculation steps S404 followed by data analyzing step S405 that combines the multiple abstracted data. The concept of this phenomena is shown in FIGS. 7(a) to 7(c). The example implementations would increase SNR if additional frequency bins contain certain level of signal. As illustrated, FIG. 7(a) illustrates an example of signal and noise in the frequency domain when multiple signals exist, FIG. 7(b) illustrates signal and noise in frequency domain when the lower frequency signal is extracted, and FIG. 7(c) illustrates signal and noise in frequency domain when the higher frequency signal is extracted, in accordance with an example implementation.

At S308, the process repeats S304, S305, S306, and S307 with slight time window change of $T_{STEP}$. For example, the second "for loop" should have a time window from T=$T_{STEP}$ to T=$T_{STEP}$+$T_{WINDOWLENGTH}$. This loop will be repeated until reaching the end of pattern ($T_{end}$).

At S309, after the "for loop" iteration, the process finds a time window that contains the largest representative wavelet component value. Now this time window is used in the normal loop. Then the process selects a frequency bin by selecting the frequency bin that has the maximum wavelet components in the wavelet analysis result of the selected time window The frequency band of this frequency bin is used for a pass band of the band pass filter block 204. These are conducted in the band selection block 213. If more than one time window is chosen, then multiple iterations of band pass filter S403 and intensity calculation S404 followed by data analyzing S405 that combines the multiple abstracted data are conducted. This process can increase SNR if additional time windows contain a certain level of signal.

In example implementations, the frequency of the mother wavelet should be narrow so that the system can analyze uncertain signals with high resolution in the frequency domain. The reason why example implementations utilize the mother wavelet with broad frequency (due to sharp change in time domain) is disclosed here. The ideal feature value which is generated based on the intensity of the physical amount of signal from the signal source with respect to the number of process done is shown in FIG. 5(a). As described above, it is expected that consumable signal sources have (a) reset of the feature value after a replacement and (b) monotonic increasing (or decreasing) of the intensity due to aging. Therefore, if sawtooth waveforms are utilized as a mother wavelet, it becomes clear how the feature signal has the component that is correlated to sawtooth characteristic. In addition, the wavelet analysis expands or shrinks mother wavelets while undergoing the analyzing process. Such implementations facilitate finding the sawtooth waveform (more specifically, the band that has the sawtooth characteristic) in presence of strong noise.

As for the WT, there are CWT (Continuous Wavelet Transformation) and DWT (Discrete Wavelet Transformation). CWT will provide better resolution while DWT will provide fast calculation and be applicable for resource-limited edge computers. However, in example implementations described herein, any WT implementation can be utilized in accordance with the desired implementation. Further, WT is a correlation analysis between time-series uncertain input and a mother wavelet which is temporarily expanded/shrunk during the analysis. Example implementations cover such a correlation analysis with a sawtooth waveform which can be expanded or shrunk during the analysis.

Second Example Implementation

In a second example implementation, the edge computer 901 transmits wideband signal to the server computer 902 in the calibration loop as the edge computer 901 does not have enough computing resources. The server computer 902 transmits information for the normal loop, namely a signal pattern corresponding to a single process, a time window, and a frequency band data for a band pass filter, to the edge computer 901 once all information is available and all analysis is completed in accordance with the first example implementation. In the calibration phase, this edge computer employs the network configuration shown in FIG. 10. The server computer should be connected via a network 903, however, it is not necessarily deployed in the same local network. For example, the server computer 902 can be deployed in another network (e.g. internet). After the calibration loop at the server computer 902, the edge computer 901 starts the normal loop so that it can reduce the communication load. In the normal loop, the network configuration can be the same as FIG. 1.

In the calibration phase, the edge computer 901 may check if there is another edge computer taking the calibration loop in the same network or check if the network usage (load) is more than a predetermined threshold. In that case, the edge computer 901 suspends its data transmission to the server computer 902 so that it can avoid network overload since the wideband signal requires considerable bandwidth of the network.

Third Example Implementation

Figure 11:
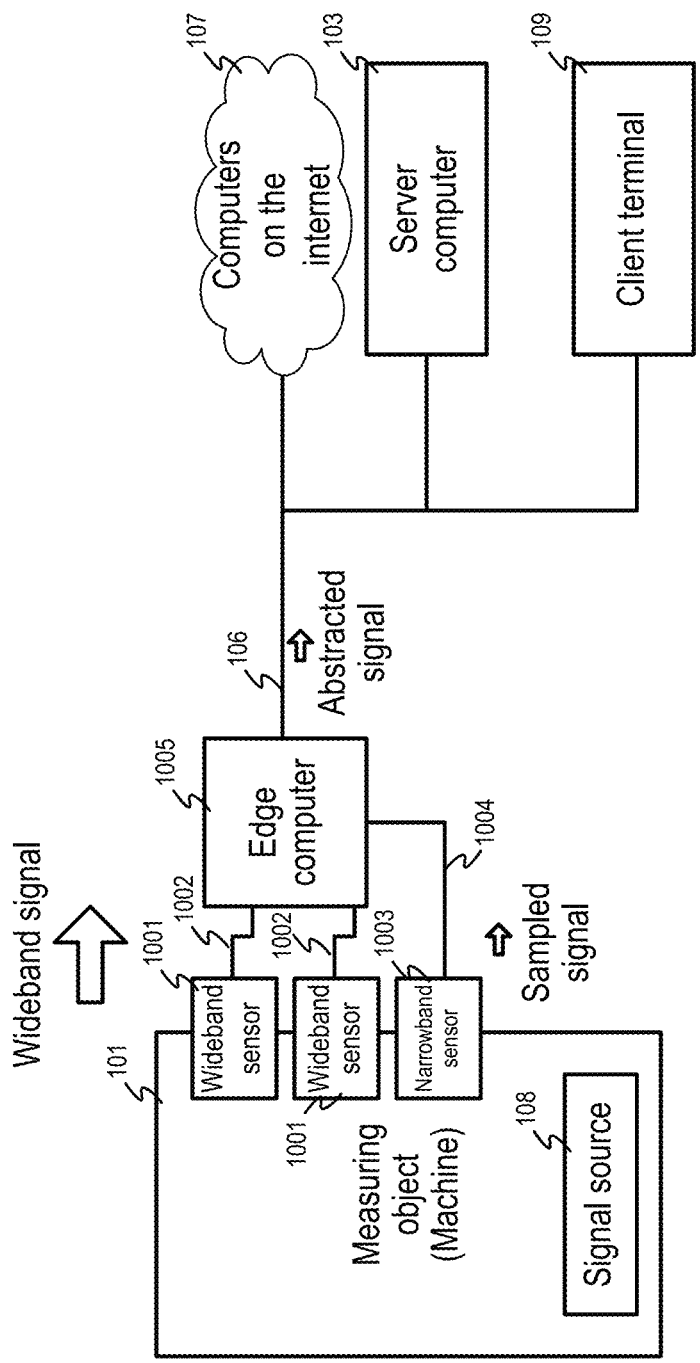
FIG. 11 illustrates an example sensing system with wideband and narrowband sensors, in accordance with an example implementation.

In a third example implementation, as shown in FIG. 11, the edge computer 1005 has a plurality of wideband sensors 1001 connected to a communication method (e.g., network) 1002 and at least one narrowband sensor 1003 connected to another communication method (e.g., another network) 1004. For example, deploying multiple accelerometers for multi-axis measurement or deploying different kinds of sensors (e.g. accelerometer and current sensor) are examples of such a configuration. As for the narrowband sensor, examples can involve a temperature sensor that can be utilized for measurement correction, or other sensors in accordance with the desired implementation.

Figure 12:
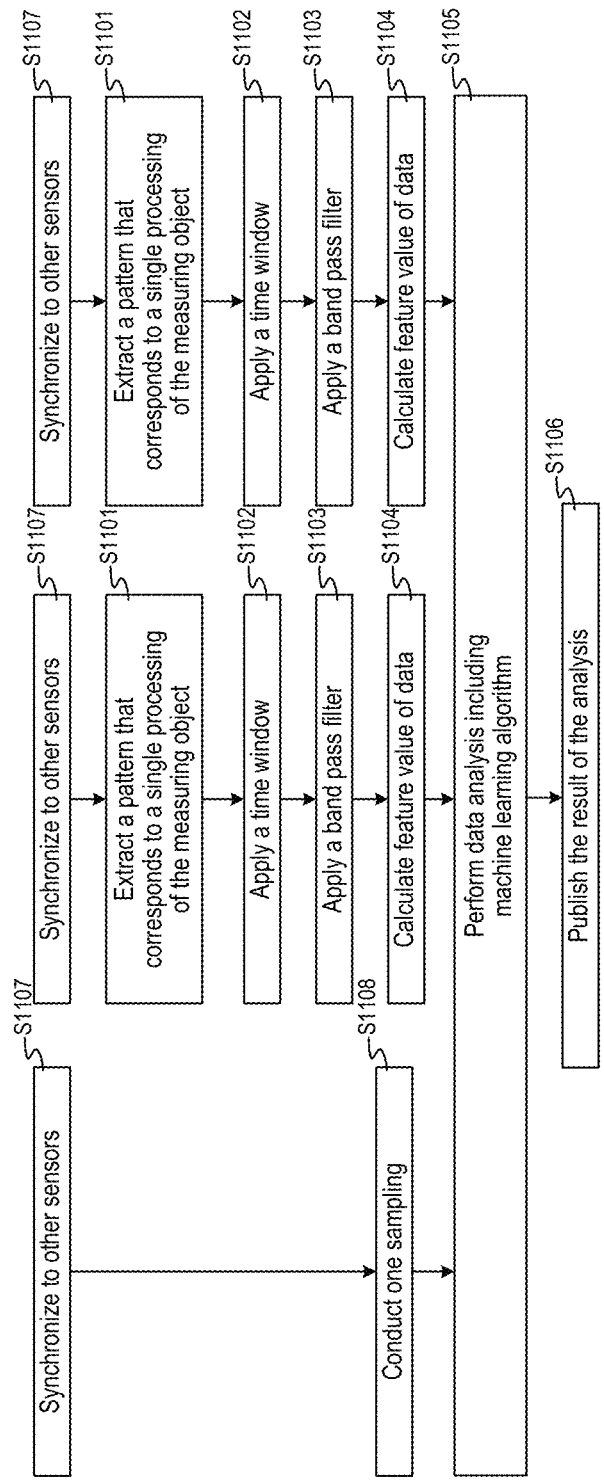
FIG. 12 illustrates an example flow of the normal loop, in accordance with an example implementation.

FIG. 12 illustrates an example flow of the normal loop 215, in accordance with an example implementation. In the normal loop, the edge computer 1005 with multiple sensors performs following steps to extract physical amount from signal source in presence of strong noise and transmit it to another computer or server. In example implementations, each wideband sensor can conduct their calibration loop as described above prior to their normal loop. Therefore, the time windows and frequencies of the band pass filter can be different as their calibration loop are conducted independently.

At S1107, the process synchronizes to the other sensors (including the narrowband sensor) each other so that all sensor data can be combined in the following analysis. At S1101, the wideband sensors extracts patterns corresponding to a single processing of the measuring object 101 from the continuous raw data in the pattern extraction block 202. At S1102, the wideband sensors apply a time window to the extracted pattern in the time window block 203. At S1103, the wideband sensors apply a band pass filter in the band pass filter block 204 followed by the feature extract block 205. At S1104, the wideband sensors calculates the feature values of the data in the feature extract block 205 as explained above. During this time at S1108, the narrowband sensor may conduct one sampling and its data may be jointly converted with the wideband sensors' data to feature values.

At S1105, the process performs data analysis including machine learning. As there are multiple inputs for the data analysis part, multiple-input single-output analytics would be applied. As different kinds of physical amounts of signal are basically complementally and their signals are extracted by the example implementations described above, combining multiple sensors would increase the SNR of the system output.

At S1106, the process publishes the result of the analysis in the previous block to a computer on the internet 107 or server computer 208 that is in the same local network. This process can be done in the publish block 206.

Through example implementations described herein, signal can be extracted from a consumable signal source even in the presence of strong noise. Further, the example implementations do not need any prior knowledge of the underlying measured object, whereas related art methods may require frequency characteristic or information regarding the usual lifetime of the underlying object.

Figure 10:
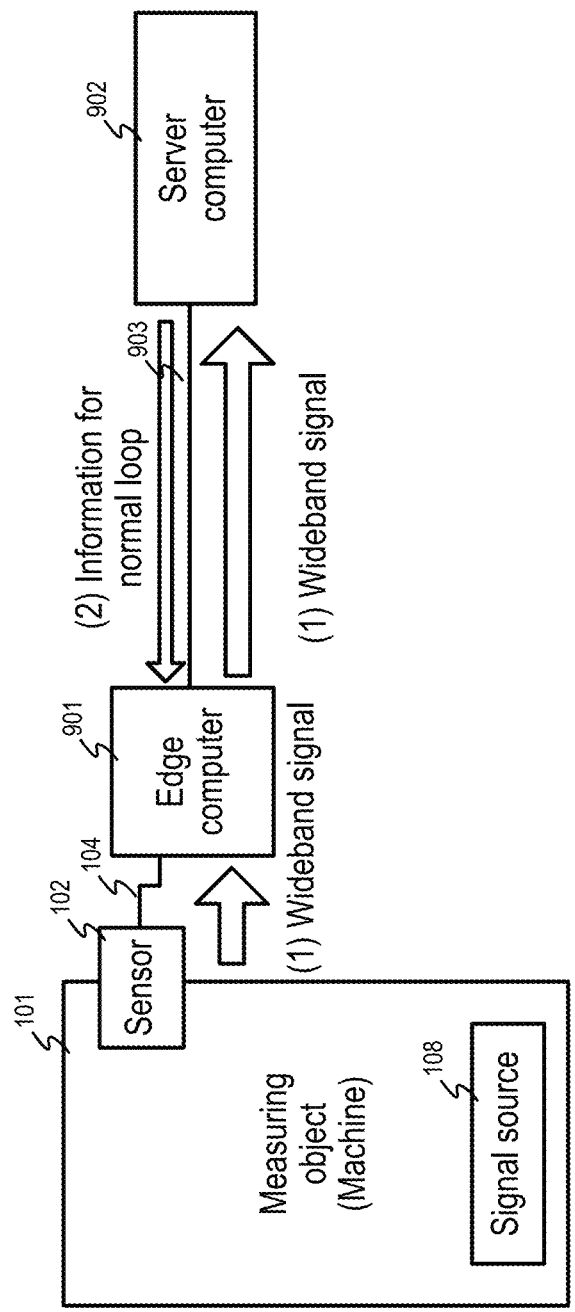
FIG. 10 illustrates an example sensing system with the signal processing method, in accordance with an example implementation.
Figure 13:
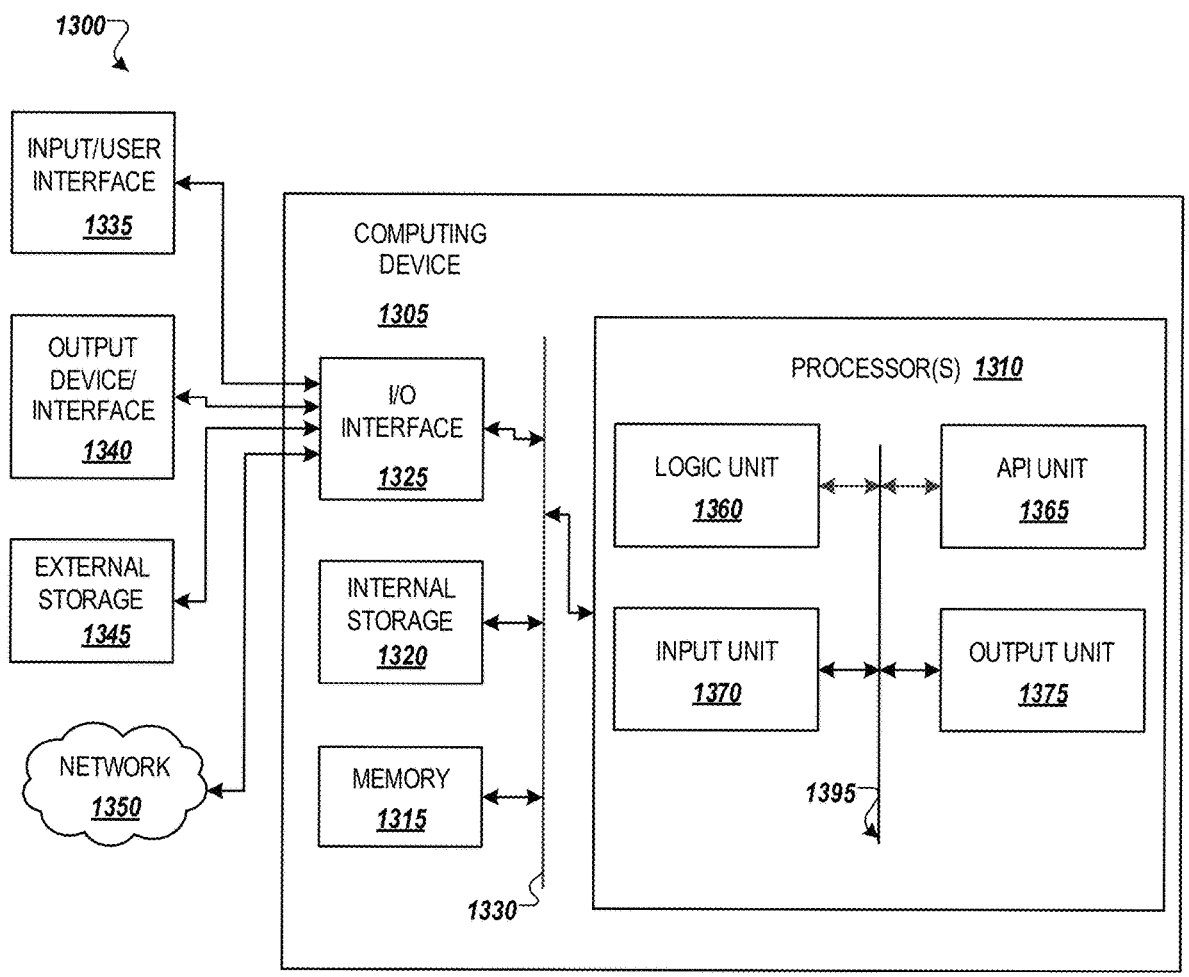
FIG. 13 illustrates an example computing environment with an example computer device suitable for use in some example implementations.

FIG. 13 illustrates an example computing environment with an example computer device suitable for use in some example implementations, such as the edge computer coupled to one or more sensing devices such as the sensors illustrated in FIGS. 1, 2, 10 and 11, or the server computer 103/902 configured to operate as a server (e.g., a backend server) for the measuring device 101 as illustrated in FIGS. 1, 10, and 11. Computer device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or I/O interface 1325, any of which can be coupled on a communication mechanism or bus 1330 for communicating information or embedded in the computer device 1305.

Computer device 1305 can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via I/O interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

I/O interface 1325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

For the computer device 1305 operating as the edge computer, the memory can operate as storage 207 and processor(s) 1310 can be configured to execute the calibration loop 210 and the normal loop 215 as illustrated in FIG. 2 along with all of the functional blocks therein, as well as the processes illustrated in the flow diagrams of 3, 6, 8 and 12.

In an example implementation for the computer device 1305 operating as the edge computer, the processor(s) 1310 can be configured to convert sensor data received from the one or more sensing devices into frequency component data, the frequency component data involving measurements on one or more parameters indicative of degradation for another device associated with the one or more sensing devices through execution of the process as illustrated in the flow of FIG. 3, S301 to S305 of FIG. 6, and the flow from 801 to 803 as illustrated in FIG. 8. In example implementations, the another device can be the machine or measuring object 101 having the signal source 108 that is measured by the sensors as illustrated in FIGS. 1, 10 and 11. Such a device can include, but are not limited to, coolers, vehicles, storage systems, and any other apparatus that is to be monitored in accordance with the desired implementation. Such parameters to be measured can include, but is not limited to, vibrations, temperature, workload, velocity of one or more moving parts, velocity of the underlying machine, acceleration of the underlying machine, and so on in accordance with the desired implementation.

In an example implementation for the computer device 1305 operating as the edge computer, the processor(s) 1310 can be configured to execute a correlation process on the frequency component data to identify one or more frequency bands that are correlated with a sawtooth pattern; and provide one or more feature values that are extracted from the sensor data with a band limitation within the frequency bands, to the server as illustrated in 202-204 of FIG. 2, the flow of FIG. 3, S306 to S309 of FIG. 6, and the flow from 803 to 804 as illustrated in FIG. 8. In such an example implementation, the correlation process can include executing a wavelet transform on the frequency component data as illustrated in FIGS. 6 and 8. In an example implementation, the executing the wavelet transform on the frequency component data can involve correlating the frequency component data to a sawtooth mother wavelet as illustrated in FIGS. 8 and 9, however is not limited thereto and other wavelets can be utilized in accordance with the desired implementation. Further, other correlation processes, such as machine learning algorithms to correlate the frequency component data to sawtooth patterns, can be utilized in accordance with the desired implementation. Through such an example implementation, it is thereby possible to extract signal more accurately than related art implementations despite the presence of heavy noise, as illustrated in the example results of FIGS. 5(*b*) and 5(*c*) when a sawtooth pattern is not utilized in the correlation process, versus the example results shown in FIGS. 5(*d*) and 5(*e*) when a sawtooth pattern is utilized in the correlation process, or in FIGS. 7(*b*) and 7(*c*). Example implementations can thereby process measurements from sensor data more accurately through the implementations described herein, thereby ensuring that the frequency bins transmitted to the backend server and the analysis conducted on the frequency bins is correctly applied to the signal of the underlying sensing devices and that the noise is correctly filtered out.

In example implementations, the one or more sensing devices can be wideband sensors, wherein the processor(s) 1310 is configured to receive second sensor data from a narrowband sensor and provide the one or more feature values that are extracted from the sensor data of the one or more wideband sensors with the band limitation within the frequency bands and from the second sensor data from the narrowband sensor, to the server as illustrated in FIGS. 11 and 12. The one or more sensing devices can be any form of sensor in accordance with the desired implementation, such as but not limited to thermometers, accelerometers, gyroscopes, and so on. Further, the one or more sensing devices can also be software functions of the underlying device or measuring object 101 configured to output data based on operations, such as bandwidth, latency, traffic entering the device, available storage, downtime, and so on in accordance with the desired implementation.

In example implementations, processor(s) 1310 can further be configured to conduct calibration before converting the sensor data to frequency component data, by providing the sensor data to the server; and receiving, from the server, one or more patterns corresponding to the sensor data; wherein the processor(s) 1310 is configured to convert the sensor data into the frequency component data through application of a band pass filtering (e.g., Fast Fourier Transform) based on the frequency bands received from the server as illustrated in FIGS. 6 and 10.

In example implementations, processor(s) 1310 can also be configured to execute a machine learning algorithm on the on the one or more feature values to determine degradation of the another device to determine degradation of the another device; and provide information associated with the degradation of the another device to the server as illustrated in elements 205 and 206 of FIG. 2 and S405 and S406 of FIG. 4. Such machine learning algorithms can conduct feature extraction to measure degradation in the form of, but not limited to, remaining useful life, estimated time until maintenance is required, probability of breakdown or downtime, and so on in accordance with the desired implementation. Any machine learning algorithm trained to determine such parameters can be utilized in accordance with the desired implementation. Further, the processor(s) of the backend server can be configured to provide instructions to the another device associated with the one or more sensing devices based on the information associated with the degradation of the another device. For example, such instructions can involve instructing the another device to undergo a maintenance mode, to shut down, to provide an alert on a terminal for the another device, or so on, depending on the desired implementation.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A device communicatively coupled to one or more sensing devices and to a server, the device comprising:
  a processor, configured to:
    convert sensor data received from the one or more sensing devices into frequency component data, the frequency component data comprising measurements on one or more parameters indicative of degradation for another device associated with the one or more sensing devices;
    execute a correlation process on the frequency component data to identify one or more frequency bands that are correlated with a sawtooth pattern; and
    provide one or more feature values that are extracted from the sensor data with a band limitation within the one or more frequency bands, to the server.

2. The device of claim 1, wherein the correlation process comprises executing a wavelet transform on the frequency component data.

3. The device of claim 2, wherein the executing the wavelet transform on the frequency component data comprises correlating the frequency component data to a sawtooth mother wavelet.

4. The device of claim 1, wherein the one or more sensing devices are wideband sensors, wherein the processor is further configured to receive second sensor data from a narrowband sensor and provide the one or more feature values that are extracted from the sensor data of the one or more wideband sensors with the band limitation within the one or more frequency bands and from the second sensor data from the narrowband sensor, to the server.

5. The device of claim 1, wherein the processor is configured to conduct calibration before converting the sensor data to frequency component data by:
  providing the sensor data to the server; and
  receiving, from the server, one or more patterns corresponding to the sensor data;
  wherein the processor is configured to convert the sensor data into the frequency component data through application of a band pass filtering based on the one or more frequency bands received from the server.

6. The device of claim 1, wherein the processor is configured to:
  execute a machine learning algorithm on the one or more feature values to determine degradation of the another device; and
  provide information associated with the degradation of the another device to the server.

7. A method for a system involving a device communicatively coupled to one or more sensing devices and to a server, the method comprising:
  converting sensor data received from the one or more sensing devices into frequency component data, the frequency component data comprising measurements on one or more parameters indicative of degradation for another device associated with the one or more sensing devices;
executing a correlation process on the frequency component data to identify one or more frequency bands that are correlated with a sawtooth pattern; and
providing the one or more feature values that are extracted from the sensor data with a band limitation within the one or more frequency bands to the server.

8. The method of claim 7, wherein the correlation process comprises executing a wavelet transform on the frequency component data.

9. The method of claim 8, wherein the executing the wavelet transform on the frequency component data comprises correlating the frequency component data to a sawtooth mother wavelet.

10. The method of claim 7, wherein the one or more sensing devices are wideband sensors, wherein the method further comprises receiving second sensor data from a narrowband sensor and providing the second sensor data with the one or more feature values that are extracted from the sensor data of the one or more wideband sensors with the band limitation within the one or more frequency bands and from the second sensor data from the narrowband sensor, to the server.

11. The method of claim 7, further comprising conducting calibration before converting the sensor data to frequency component data, the calibration comprising:
providing the sensor data to the server; and
receiving, from the server, one or more patterns corresponding to the sensor data;
wherein the processor is configured to convert the sensor data into the frequency component data through application of a band pass filtering based on the one or more frequency bands received from the server.

12. The method of claim 7, further comprising:
executing a machine learning algorithm on the one or more feature values to determine degradation of the another device; and
providing information associated with the degradation of the another device to the server.

13. A system, comprising:
a server;
one or more sensing devices; and
a device communicatively coupled to the one or more sensing devices and the server, the device comprising:
a processor, configured to:
convert sensor data received from the one or more sensing devices into frequency component data, the frequency component data comprising measurements on one or more parameters indicative of degradation for another device associated with the one or more sensing devices;
execute a correlation process on the frequency component data to identify one or more frequency bands that are correlated with a sawtooth pattern; and
provide the one or more feature values that are extracted from the data of both wideband sensor with a band limitation with the one or more frequency bands and the narrowband sensor to the server.

14. The system of claim 13, wherein the correlation process comprises executing a wavelet transform on the frequency component data.

15. The system of claim 14, wherein the executing the wavelet transform on the frequency component data comprises correlating the frequency component data to a sawtooth mother wavelet.

16. The system of claim 13, wherein the one or more sensing devices are wideband sensors, wherein the processor is configured to receive second sensor data from a narrowband sensor and provide the second sensor data with the one or more feature values that are extracted from the sensor data of the one or more wideband sensors with the band limitation within the one or more frequency bands and from the second sensor data from the narrowband sensor, to the server.

17. The system of claim 13, wherein the processor is further configured to conduct calibration before converting the sensor data to frequency component data, by:
providing the sensor data to the server; and
receiving, from the server, one or more patterns corresponding to the sensor data;
wherein the processor is configured to convert the sensor data into the frequency component data through application of a band pass filtering based on the one or more frequency bands received from the server.

18. The system of claim 13, wherein the processor is configured to:
execute a machine learning algorithm on the one or more feature values to determine degradation of the another device; and
provide information associated with the degradation of the another device to the server;
wherein the server is configured to provide instructions to the another device associated with the one or more sensing devices based on the information associated with the degradation of the another device.

* * * * *